US011425902B2

(12) United States Patent
Anderson et al.

(10) Patent No.: US 11,425,902 B2
(45) **Date of Patent: *Aug. 30, 2022**

(54) AQUEOUS AGRICULTURAL COMPOSITION HAVING IMPROVED SPRAY DRIFT PERFORMANCE

(71) Applicant: BASF SE, Ludwigshafen am Rhein (DE)

(72) Inventors: Timothy H Anderson, Cincinnati, OH (US); Dean A Oester, Cincinnati, OH (US); Andrew P Chiromo, Cincinnati, OH (US); Tobias Joachim Zimmermann, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 553 days.

This patent is subject to a terminal disclaimer.

(21) Appl. No.: 16/099,808

(22) PCT Filed: May 11, 2017

(86) PCT No.: PCT/US2017/032073

§ 371 (c)(1),
(2) Date: Nov. 8, 2018

(87) PCT Pub. No.: WO2017/197066

PCT Pub. Date: Nov. 16, 2017

(65) Prior Publication Data

US 2019/0110467 A1 Apr. 18, 2019
US 2020/0214283 A9 Jul. 9, 2020

Related U.S. Application Data

(60) Provisional application No. 62/334,618, filed on May 11, 2016.

(51) Int. Cl.

| | |
|---|---|
| *A01N 25/10* | (2006.01) |
| *A01N 57/20* | (2006.01) |
| *A01N 25/06* | (2006.01) |
| *A01N 43/40* | (2006.01) |
| *A01N 25/30* | (2006.01) |
| *A01N 37/10* | (2006.01) |

(52) U.S. Cl.
CPC ............ *A01N 25/10* (2013.01); *A01N 25/06* (2013.01); *A01N 25/30* (2013.01); *A01N 37/10* (2013.01); *A01N 43/40* (2013.01); *A01N 57/20* (2013.01)

(58) Field of Classification Search
CPC ........ A01N 25/06; A01N 25/10; A01N 25/30; A01N 37/10; A01N 43/40; A01N 57/20
See application file for complete search history.

(56) References Cited

U.S. PATENT DOCUMENTS

| | | | | |
|---|---|---|---|---|
| 2012/0238448 | A1 | 9/2012 | Schneider et al. | |
| 2013/0123104 | A1 | 5/2013 | McKnight et al. | |
| 2015/0237851 | A1 | 8/2015 | Drew | |
| 2015/0329669 | A1 * | 11/2015 | Bittner | C08G 65/2648 568/618 |
| 2018/0206484 | A1 | 7/2018 | Bittner et al. | |

FOREIGN PATENT DOCUMENTS

| | | | | |
|---|---|---|---|---|
| CA | 2892689 | A1 | 6/2014 | |
| JP | 2013512870 | A | 4/2013 | |
| WO | 2011128236 | A2 | 10/2011 | |
| WO | 2012136613 | A1 | 10/2012 | |
| WO | 2014095608 | A2 | 6/2014 | |
| WO | WO-2014095608 | A2 * | 6/2014 | C08F 216/1416 |

OTHER PUBLICATIONS

Lewis, Reece W., et al. "Polymeric drift control adjuvants for agricultural spraying." Macromolecular Chemistry and Physics 217.20 (2016): 2223-2242.*
Fietsam, J. F. W., B. G. Young, and R. W. Steffen. "Differential response of herbicide drift reduction nozzles to drift control agents with glyphosate." Transactions of the ASAE 47.5 (2004): 1405.*
International Search Report for International Application No. PCT/US2017/032073, dated Jun. 19, 2017, 3 pages.
Written Opinion of the International Searching Authority for International Application No. PCT/US2017/032073, dated Jun. 19, 2017, 8 pages.
Downey et al., "Pulsed-jet microspray applications for high spatial resolution of deposition on biological targets", Atomization and Sprays, vol. 14, Issue 2, 2004, pp. 93-109.

* cited by examiner

*Primary Examiner* — Frederick F Krass
*Assistant Examiner* — Amanda Michelle Petritsch
(74) *Attorney, Agent, or Firm* — Armstrong Teasdale LLP

(57) ABSTRACT

An aqueous agricultural composition includes a pesticide, water, and a co-polymer. The co-polymer is the reaction product of an acrylamide monomer and a macromonomer. The acrylamide monomer and the macromonomer react together in the absence of an anionic monoethylenically unsaturated monomer including an acidic group chosen from —COOH, —$SO_3H$, —$PO_3H_2$ and associated salts. The disclosed aqueous agricultural composition may be incorporated into agricultural spray operations and demonstrates effective reduction of driftable droplets.

17 Claims, No Drawings

AQUEOUS AGRICULTURAL COMPOSITION HAVING IMPROVED SPRAY DRIFT PERFORMANCE

CROSS-REFERENCE TO RELATED APPLICATIONS

This application is a U.S. National Phase Application of PCT/US2017/032073, filed May 11, 2017, which claims the benefit of priority to U.S. Provisional Application No. 62/334,618, filed May 11, 2016, the contents of which are hereby expressly incorporated by reference in their entirety.

FIELD OF THE DISCLOSURE

This disclosure generally relates to an aqueous agricultural composition having improved spray drift performance. More specifically, this disclosure relates to an aqueous agricultural composition that includes a pesticide, water, and a co-polymer formed using a particular macromonomer.

BACKGROUND

Use of pesticides is essential in farming and agricultural industries. In these industries, the pesticides reduce the presence of harmful organisms and plants (such as weeds) that decrease crop yields and crop quality. Pesticides, when applied, are expected to be aimed at, and reach, a specific target, such as a plant. When a pesticide travels to where it is not needed or wanted, (i.e., when the pesticide "drifts"), unwanted consequences may result. Almost every pesticide, upon spray application, produces some amount of drift off of the target area. For example, drift is affected by such factors as the formulation of the pesticide, the amount of the pesticide sprayed, the application method, the weather, and whether auxiliary surfactants are present in the spray solution. More specifically, drift is the movement of the pesticide through the air away from the intended target. The drift can be in the form of water or liquid droplets.

Spray drift typically describes drift that occurs during or shortly after spraying of the pesticide on the target. Application is, for example, accomplished using ground spraying equipment or via aerial spraying. Spray drift often occurs when wind blows the pesticide off the intended target. Accordingly, there remains opportunity for improvement.

SUMMARY OF THE DISCLOSURE

This disclosure provides an aqueous agricultural composition. The aqueous agricultural composition includes a pesticide, water, and a co-polymer. The co-polymer is the reaction product of: (A) an acrylamide monomer and (B) a macromonomer. The macromonomer has the formula:

$$H_2C=C(R^1)-R^2-O-(CH_2-CH_2-O-)_k-(CH_2-CH(R^3)-O-)_l-(CH_2-CH_2-O-)_mR^4.$$

wherein the (A) acrylamide monomer and the (B) macromonomer react together in the absence of (C) an anionic monoethylenically unsaturated monomer comprising at least one acidic group chosen from —COOH, —SO$_3$H, —PO$_3$H$_2$ and salts thereof.

DETAILED DESCRIPTION OF THE DISCLOSURE

This disclosure provides an aqueous agricultural composition (hereinafter described as the "composition"). The terminology "aqueous" describes that the composition includes some water. The terminology "agricultural" describes that the composition is, for example, used to treat plants or crops or used in a farming context. However, the composition is not limited to such uses.

The composition includes a pesticide, water, and a co-polymer. Each is described in detail below. In various embodiments, the composition is, consists essentially of, or consists of, the pesticide, water, and the co-polymer. The terminology "consists essentially of" describes embodiments that are free of other (co-)polymers different from the co-polymer, and/or one or more additives, such as any one or more additives described herein, and/or one or more pesticides different from the aforementioned pesticide. In such "consisting essentially of" embodiments, the composition may be free of any additive, pesticide, or polymer known in the art so long as the composition includes the pesticide, water, and the co-polymer of this disclosure.

This disclosure also provides an agricultural emulsion (hereinafter described as the "emulsion") and an emulsifiable concentrate (hereinafter described as the "concentrate"), also described in detail below. The concentrate may be further diluted with water or another solvent to form the emulsion at point of sale and/or use. In one embodiment, the emulsion and the composition are the same. That is, in this one non-limiting embodiment, the composition is an emulsion.

Spray Drift Performance:

The composition is typically applied through a spray nozzle onto a target, such as a plant. The composition is typically atomized under pressure by various engineered nozzles to form spray droplets. In various embodiments, the percentage of droplets having a diameter less than, for example, 105 or 140 microns, are described as "fines." The optimum droplet size tends to depend on the application. If droplets are too large, there will be less coverage by the spray. The maximum acceptable droplet size may depend on the amount of the concentrate or composition being applied per unit area and the mode of action of the pesticide active ingredient. Smaller droplets provide more even coverage, but are more prone to drift during spraying. If it is windy during spraying, larger droplets may be preferred, whereas on a calmer day smaller droplets may be preferred. In addition, spray droplet size may also depend on the spray apparatus; e.g. spray nozzle size and type, height from target, and configuration. The terminology "improved" describes that the compositions of this disclosure produce less "fines" when spraying, as compared to a comparative composition that includes, for example, only the pesticide and water, or just water alone. Various evaluations are set forth in the Examples that further describe such improvements.

In various embodiments, the compositions of the disclosure show a reduced volume percent of droplets having a diameter less than 105, 110, 115, 120, 125, 130, 135, 140, 145, 150, 155 or 160 microns, as determined using ASTM E2798-11 and a Malvern Spray Tech droplet analyzer. In other embodiments, less than 70, 65, 60, 55, 50, 45, 40, 35, 30, 25, 20, 15, 10, 5, 4, 3, 2, or 1, percent of the droplets have a diameter of less than 105, 110, 115, 120, 125, 130, 135, 140, 145, 150, 155, or 160, microns, upon spraying, as determined using ASTM E2798-11 and a Malvern Spray Tech droplet analyzer. In various embodiments, the compositions of the disclosure show an average fines reduction of 99, 90, 80, 70, 60, 50, 40, 30, or 20 percent, as determined using ASTM E2798-11 and a Malvern Spray Tech droplet analyzer and, for example, a nozzle such as a TeeJet 8002VS nozzle. In other words, in various embodiments, a small percentage of the droplets have small diameters, which is typically desirable because this results in less spray drift. In various non-limiting embodiments, all values and ranges of values between and including the aforementioned values are hereby expressly contemplated.

In one embodiment, the aqueous agricultural composition produces fines % V<105 μm of less than 15, upon spraying, as determined using ASTM E2798-11 and a Malvern Spray Tech droplet analyzer and a TeeJet 8002VS nozzle. In another embodiment, the aqueous agricultural composition produces fines % V<105 μm of less than 10, upon spraying, as determined using ASTM E2798-11 and a Malvern Spray Tech droplet analyzer and a TeeJet 8002VS nozzle. In a further embodiment, the aqueous agricultural composition produces fines % V<105 μm of less than 5, upon spraying, as determined using ASTM E2798-11 and a Malvern Spray Tech droplet analyzer and a TeeJet 8002VS nozzle. In one embodiment, the aqueous agricultural composition produces fines % V<105 μm of less than 2, upon spraying, as determined using ASTM E2798-11 and a Malvern Spray Tech droplet analyzer and a TeeJet 8002VS nozzle.

In one embodiment, the aqueous agricultural composition produces fines % V<141 μm of less than 30, upon spraying, as determined using ASTM E2798-11 and a Malvern Spray Tech droplet analyzer and a TeeJet 8002VS nozzle. In another embodiment, the aqueous agricultural composition produces fines % V<141 μm of less than 20, upon spraying, as determined using ASTM E2798-11 and a Malvern Spray Tech droplet analyzer and a TeeJet 8002VS nozzle. In still another embodiment, the aqueous agricultural composition produces fines % V<141 μm of less than 10, upon spraying, as determined using ASTM E2798-11 and a Malvern Spray Tech droplet analyzer and a TeeJet 8002VS nozzle. In another embodiment, the aqueous agricultural composition produces fines % V<141 μm of less than 5, upon spraying, as determined using ASTM E2798-11 and a Malvern Spray Tech droplet analyzer and a TeeJet 8002VS nozzle.

Pesticide:

The composition includes the pesticide. The terminology "pesticide," as used herein, is well known in the art and is described at least by the Environmental Protection Agency (EPA), in the Federal Insecticide, Fungicide, and Rodenticide Act (FIFRA), in the Insecticides and Environmental Pesticide Control Subchapter (7 U.S.C. § 136(u)), in the Code of Federal Regulations (CFR) relating to the "Protection of Environment," and in the Regulations of the EPA in 40 CFR § 152.3.

A pesticide is, for example, recognized in the art as a substance that is used for preventing, destroying, repelling, regulating, and/or mitigating any pest. A pest is an organism that is deleterious to man or the environment but does not include any internal parasite of living man or other living animal or any fungus, bacterium, virus, or other microorganism on or in living man or other living animals. Said differently, the terminology "pest" does not typically include any organism that infects or sickens humans or animals. In addition, the terminology "pesticide," as used herein, does not typically include any human or animal drugs or pharmaceuticals, any article that is a "new animal drug" as defined in the art, any liquid sterilant applied to a device used in the human body, and/or any products intended for use against fungi, bacteria, viruses, or other microorganisms in or on living man or living animal. Moreover, the pesticide of this disclosure does not typically include drugs or pharmaceuticals used to control diseases of humans or animals (such as livestock and pets).

The pesticide may be further defined as a fungicide, herbicide, insecticide, or combinations thereof. In one embodiment, the pesticide is a fungicide. In another embodiment, the pesticide is a herbicide. In another embodiment, the pesticide is an insecticide. Suitable fungicides include, but are not limited to: azoxystrobin, benalaxyl, carbendazim, chlorothalonil, cupfer, cymoxanil, cyproconazol, diphenoconazol, dinocap, epoxyconazol, fluazinam, flusilazol, flutriafol, folpel, fosetyl aluminum, kresoxim methyl, hexaconazol, mancozeb, metalaxyl, metconazol, myclobutanil, ofurace, phentinhydroxide, prochloraz, pyremethanil, soufre, tebucanazol and tetraconazol, and mixtures thereof.

Suitable herbicides include, but are not limited to: alachlor, acloniphen, acetochlor, amidosulfuron, aminotriazol, atrazin, bentazon, biphenox, bromoxyl octanoate, bromoxynil, clethodim, chlodinafop-propargyl, chloridazon, chlorsulfuron, chlortoluron, clomazon, cycloxydim, desmedipham, dicamba, dicyclofop-methyl, diurea, difluphenicanil, dimithenamid, ethofumesat, fluazifop, fluazifop-p-butyl, fluorochloridon, fluroxypyr, glufosinate, glyphosate, galoxyfop-R, ioxynil octanoate, isoproturon, isoxaben, metamitron, metazachlor, metolachlor, metsulfuron-methyl, nicosulfuron, notflurazon, oryzalin, oxadiazon, oxyfluorphen, paraquat, pendimethalin, phenmedipham, phenoxyprop-p-ethyl, propaquizafop, prosulfocarb, quizalofop, sulcotrion, sulphosat, terbutylazin, triasulfuron, trichlorpyr, triflualin and triflusulforon-methyl which may be used individually or in admixture with one another.

Suitable insecticides include, but are not limited to: biphenthrin, carbofuran, carbosulfan, chlorpyriphos-methyl, chlorpyriphos-ethyl, β-cyfluthrin, λ-cyhalothrin, cyhexatin, cypermethrin, dicofol, endosulfan, τ-fluvalinat, α-methrin, δ-methrin, phenbutatin, pyrimicarb, terbuphos and tebuphenpyrad and mixtures thereof.

In one embodiment, the pesticide is an ionic pesticide. In another embodiment, the pesticide is a non-ionic pesticide. In another embodiment, the pesticide is a fungicide. In a further embodiment, the pesticide is a herbicide. In yet a further embodiment, the pesticide is an insecticide. In another embodiment, the pesticide is a strobilurine. In one embodiment, the pesticide is a fungicide or herbicide or insecticide. In another embodiment, the pesticide is a fungicide or herbicide. In still another embodiment, the pesticide is glyphosate or a salt thereof, strobilurine, glufosinate or a salt thereof and/or triclopyr-2-butoxyethyl ester.

In various embodiments, the pesticide is glyphosate (e.g. commercially available as Roundup® PowerMax from Monsanto). In another embodiment, the pesticide is pyraclostrobin (commercially available as Headline® from BASF). In a further embodiment, the pesticide is triclopyr-2-butoxyethyl ester (commercially available as Remedy Ultra® from Dow AgroSciences). In another embodiment, the pesticide is glufosinate (commercially available as Liberty® from Bayer Crop Science). In an additional embodiment, the pesticide is a combination of two or more of the aforementioned compounds.

The pesticide may be present in the composition in any amount, e.g. as specified by the product label. The pesticide is, for example, present in the composition in amounts from about 0.01 to about 85, 0.1 to about 60, 1 to about 20, about 1 to about 8, weight percent based on a total weight of the composition. In other embodiments, the pesticide is present in an amount (or in an amount equivalent to) from 1 to 1000, from 10 to 900, from 100 to 800, from 400 to 700, from 500 to 600, or about 400, grams of pesticide per liter. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10, %.

Water:

The composition also includes water. The water may be of any type, e.g. tap water, well water, purified water, deionized water, and combinations thereof and may be present in varying amounts. The water may be added to the co-polymer and/or the pesticide to form the composition in a spray tank or in an independent tank prior to addition to a spray tank. In various embodiments the pesticide and/or co-polymer may be added to an independent container and/or a spray tank with spray water or separate from the spray water.

The water may be present in an amount of from 10 to 99, from 20 to 99, from 30 to 99, from 40 to 99, from 50 to 99, from 60 to 99, from 70 to 99, or from 80 to 90, parts by weight per 100 parts by weight of the composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10, %.

Co-Polymer:

The composition and the concentrate also includes the co-polymer. The co-polymer is not particularly limited relative to weight average molecular weight (Mw). In various embodiments, the co-polymer has a weight average molecular weight (Mw) of from 2,000,000 to 15,000,000, from 2,500,000 to 14,500,000, from 3,000,000 to 14,000,000, or from 4,000,000 to 12,000,000 g/mol. In other embodiments, the co-polymer has a weight average molecular weight (Mw) of 2, 3, 4, 5, 6, 7, 8, 9, 10, 11, 12, 13, 14, or 15, million, g/mol or any range therebetween. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10, %.

In other embodiments, the co-polymer has an intrinsic viscosity of from 3 to 26, from 5 to 24, from 8 to 22, from 10 to 20, or from 12 to 18, dL/g. In various non-limiting embodiments, all values and ranges of values between and including the aforementioned values are hereby expressly contemplated.

The co-polymer is the reaction product of (A) an acrylamide monomer and (B) a macromonomer. The macromonomer has the formula:

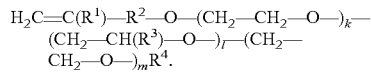

$H_2C=C(R^1)-R^2-O-(CH_2-CH_2-O-)_k-(CH_2-CH(R^3)-O-)_l-(CH_2-CH_2-O-)_mR^4$.

(A) and (B) react together in the absence of (free of) (C) an anionic monoethylenically unsaturated monomer including at least one acidic group chosen from —COOH, —SO$_3$H, —PO$_3$H$_2$ and salts thereof. In other words, the co-polymer is free of anionic monoethylenically unsaturated monomers or any reaction products of (A) and (C), (B) and (C), or (A), (B), and (C). Moreover, the composition itself is typically free of (C) anionic monoethylenically unsaturated monomers. However, it is to be appreciated that acrylamide portions of the co-polymer may degrade in the composition (e.g. during storage), via hydrolysis, to form acrylic acid residues and/or anionic monoethylenically unsaturated monomer residues. Even in these cases, (C) is not part of the reaction product of (A) and (B) and instead is an non-desired contaminant formed by hydrolysis. If such residues are present in the composition, they are typically present in amounts of less than 5, 4, 3, 2, 1, 0.1, 0.05, 0.01, or 0.001, weight percent, based on a total weight of the co-polymer or based on the total weight of the composition. The co-polymer may be alternatively described as being, or consisting of, the reaction product of (A) and (B) and may be, for example, free of any other reactants or reaction products, such as (C) or any other monomers or polymers.

The amount of (A) and (B) used to form the co-polymer is not particularly limited and (A) and (B) may be used in any amounts. In various embodiments, the co-polymer is the reaction product of 90 to 99.9 weight percent of (A) the acrylamide monomer and 0.1 to 10 weight percent of (B) the macromonomer, based on a total weight of the co-polymer. For example, the acrylamide monomer may be utilized in an amount of from 90 to 99.9, 91, 92, 93, 94, 95, 96, 97, 98, or 99, weight percent, based on a total weight of the co-polymer. The weight percent chosen may be related to glyphosate compatibility. In alternative embodiments, the macromonomer may be utilized, in an amount of from 0.1, 0.2, 0.3, 0.4, 0.5, 0.6, 0.7, 0.8, 0.9, 1, 2, 3, 4, 5, 6, 7, 8, 9, or 10, weight percent, based on a total weight of the co-polymer. In another embodiment, the macromonomer is utilized in an amount of from 0.5 to 3 weight percent, based on a total weight of the co-polymer. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

The co-polymer itself is typically present in an amount of from 0.01 to 10 weight percent based on a total weight of the composition. In various embodiments, the co-polymer is present in an amount of 0.01 to 0.05, 0.01 to 0.1, 0.05 to 0.1, 0.1 to 0.5, 0.1 to 1, 0.5 to 1, 1 to 2, 2 to 3, 3 to 4, 4 to 5, 1 to 5, 1 to 4, 1 to 3, etc., weight percent based on a total weight of the composition. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

(A) Acrylamide Monomer:

The acrylamide monomer is not particularly limited any may be any known in the art. In one embodiment, the acrylamide monomer is alternatively described as acrylic amide (IUPAC: prop-2-enamide) and has the formula C$_3$H$_5$NO. In various embodiments, the acrylamide monomer is chosen from (meth) acrylamide, N-methyl (meth) acrylamide, N, N'-dimethyl (meth) acrylamide, N-methylol (meth) acrylamide, or combinations thereof. In one embodiment, the acrylamide monomer is (meth)acrylamide or acrylamide. In another embodiments, mixtures of different monomers are used and may include, for example, at least 50 mol % of (meth)acrylamide and/or acrylamide.

(B) Macromonomer:

Referring back to the macromonomer, the macromonomer has the formula:

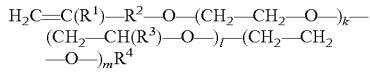

$H_2C=C(R^1)-R^2-O-(CH_2-CH_2-O-)_k-(CH_2-CH(R^3)-O-)_l-(CH_2-CH_2-O-)_mR^4$ wherein k is from 5 to 150; l is from 0 to 25; m is from 0 to 15; R$^1$ is H or methyl; R$^2$ is independently a single bond or a divalent linking group chosen from —(C$_n$H$_{2n}$)— and —O—(C$_{n'}$H$_{2n'}$), wherein n is from 1 to 6 and n' is from 2 to 6; R$^3$ is independently a hydrocarbyl radical having at least 2 carbon atoms or an ether group of the general formula —CH$_2$—O—R$^{3'}$ where R$^{3'}$ is a hydrocarbyl radical having at least 2 carbon atoms; and R$^4$ is independently H or a hydrocarbyl radical having 1 to 4 carbon atoms.

In various embodiments, k is from 5 to 150, from 6 to 75, or from 15 to 30. In other embodiments, l is from 0 to 25, from 5 to 16, or from 6 to 10. In other embodiments, m is from 0 to 15, from 0 to 8, or from 0 to 4.

In other embodiments, R$^1$ is hydrogen (H). Alternatively, R$^1$ may be methyl. In still other embodiments, R$^2$ is independently a single bond. Alternatively, R$^2$ is —(C$_n$H$_{2n}$)—. Alternatively, R$^2$ is —O—(C$_n$H$_{2n'}$)—. Relative to these formulae, n is 1, 2, 3, 4, 5, or 6 and n' is 2, 3, 4, 5, or 6. In other embodiments, R$^3$ is independently a hydrocarbyl radical having at least 2 carbon atoms such as 2, 3, 4, 5, 6, 7, 8, 9, or 10 carbon atoms. Alternatively, R$^3$ is an ether group of the general formula —CH$_2$—O—R$^{3'}$ where R3' is a hydrocarbyl radical having at least 2 carbon atoms, such as 2, 3, 4, 5, 6, 7, 8, 9, or 10 carbon atoms. In additional embodiments, R$^4$ is independently a hydrogen atom (H) or a hydrocarbyl radical having 1, 2, 3, or 4 carbon atoms.

In various embodiments, an ethylenic group H$_2$C=C(R$^1$)— is bonded via a divalent linking group —R$^2$—O— to a polyalkyleneoxy radical in block structure —(—CH$_2$—CH$_2$—O—)$_k$—(—CH$_2$—CH(R$^3$)—O—)$_l$—R$^4$, where the two blocks —(—CH$_2$—CH$_2$—O—)$_k$ and —(—CH$_2$—CH(R$^3$)—O—)$_l$ are arranged in the formula set forth above. The macromonomer may also have a further polyethyleneoxy block —(—CH$_2$—CH$_2$—O—)$_m$. The terminal polyalkyleneoxy radical —(—CH$_2$—CH(R$^3$)—O—)$_l$ or —(—CH$_2$—CH$_2$—O)$_m$ for example has either a terminal OH group or a terminal ether group —OR$^4$.

The orientation of the hydrocarbyl radicals R$^3$ may depend on conditions of alkoxylation, for example on the catalyst selected for the alkoxylation. The alkyleneoxy groups may thus be incorporated into the macromonomer either in the orientation —(—CH$_2$—CH(R$^3$)—O—) or in the inverse orientation —(—CH(R$^3$)—CH$_2$—O—)—. The representation in the aforementioned formula of the macromonomer shall therefore not be regarded as being restricted to a particular orientation of the R$^3$ group.

In various embodiments, the linking R$^2$ group includes straight-chain or branched aliphatic acyclic hydrocarbyl groups having 1 to 6 carbon atoms, which are joined either directly or via an ether group —O— to the ethylenic group H$_2$C=C(R$^1$)—. The —(C$_n$H$_{2n}$)—, and —(C$_n$H$_{2n'}$)— groups are, for example, linear aliphatic hydrocarbyl groups.

The R$^2$=—(C$_n$H$_{2n}$)— group is, for example, a group chosen from —CH$_2$—, —CH$_2$—CH$_2$— and —CH$_2$—CH$_2$—CH$_2$—, e.g. a methylene group —CH$_2$—. The R$^2$=—O—(C$_n$H$_{2n'}$)— group is, for example, a group chosen from —O—CH$_2$—CH$_2$—, —O—CH$_2$—CH$_2$—CH$_2$— and —O—CH$_2$—CH$_2$—CH$_2$—CH$_2$—, e.g. —O—CH$_2$—CH$_2$—CH$_2$—. In addition, R$^2$ is, for example, a group chosen from —CH$_2$— and —O—CH$_2$—CH$_2$—CH$_2$—, for example —O—CH$_2$—CH$_2$—CH$_2$—.

The macromonomer may also have a polyalkyleneoxy radical including the (—CH$_2$—CH$_2$—O—)$_k$, (—CH$_2$—CH(R$^3$)—O—)$_l$ and optionally —(—CH$_2$—CH$_2$—O—)$_m$ units, where the units are arranged in block structure in the sequence shown in formula (I). The transition between the blocks may be abrupt or else continuous. Moreover, the —(—CH$_2$—CH$_2$—O—)$_k$ block is a for example a poly ethylene oxy radical.

In various embodiments, the number of alkyleneoxy units k is from 5 to 150, for example 12 to 100, for example 15 to 80, even for example 23 to 26 and, for example, approximately 24.5. The numbers mentioned are mean values of distributions.

In other embodiments, the terminal block —(—CH$_2$—CH(R$^3$)—O—)$_l$— the R$^3$ radicals are each independently hydrocarbyl radicals having at least 2 carbon atoms, for example 2 to 14 carbon atoms, for example 2 to 4, and for example 2 or 3 carbon atoms. This may be an aliphatic and/or aromatic, linear or branched hydrocarbyl radical. In one embodiment, it is an aliphatic radical. Examples of suitable R$^3$ radicals include ethyl, n-propyl, n-butyl, n-pentyl, n-hexyl, n-heptyl, n-octyl, n-nonyl or n-decyl and phenyl. Examples of typical radicals include n-propyl, n-butyl and n-pentyl. R$^3$ is, for example, ethyl and/or n-propyl. Examples of suitable R$^3$ radicals include ethyl, n-propyl, n-butyl, n-pentyl, n-hexyl, n-heptyl, n-octyl, n-nonyl, n-decyl, n-dodecyl, n-tetradecyl and phenyl.

In various embodiments, if R$^3$ is an ether group —CH$_2$—O—R$^{3'}$, the sum total of the carbon atoms is understood to mean the sum total of the carbon atoms in all hydrocarbyl radicals R$^{3'}$, not including the carbon atom of the —CH$_2$— group in —CH$_2$—O—R$^{3'}$.

In further embodiments, the sum totals of the carbon atoms in all hydrocarbyl radicals R$^3$ or R$^{3'}$ is, for example, in the range from 0 to 60, for example from 5 to 56, for example from 15 to 50, for example from 25.5 to 50, further for example from 25.5 to 34.5. The sum totals of the carbon atoms in all hydrocarbyl radicals R$^3$ or R$^{3'}$ may be, for example, in the range from 25.5 to 34.5.

In other embodiments, R$^3$ is ethyl and l is from 0 to 25, for example from 5 to 20, for example from 8 to 16, for example 14, 16 or 22. Alternatively, in another embodiment, R$^3$ is n-propyl and l is from 0 to 25, for example 5 to 20, for example 10 or 11. The R$^3$ radicals may additionally be ether groups of the general formula —CH$_2$—O—R$^{3'}$ where R$^{3'}$ is an aliphatic and/or aromatic, linear or branched hydrocarbyl radical having at least 2 carbon atoms, for example 2 to 10 carbon atoms, for example at least 3. Examples of R$^{3'}$ radicals include n-propyl, n-butyl, n-pentyl, n-hexyl, 2-ethylhexyl, n-heptyl, n-octyl, n-nonyl, n-decyl or phenyl. Examples of suitable R$^{3'}$ radicals include n-propyl, n-butyl, n-pentyl, n-hexyl, n-heptyl, n-octyl, n-nonyl, n-decyl, n-dodecyl, n-tetradecyl and phenyl.

In further embodiments, the —(—CH$_2$—CH(R$^3$)—O—)$_l$— block is a block including alkyleneoxy units having at least 4 carbon atoms, for example at least 5 carbon atoms, and/or glycidyl ethers having an ether group of at least 2, for example at least 3 carbon atoms. The units of the second terminal block are, for example, alkyleneoxy units including at least 4 and/or 5 carbon atoms, such as butyleneoxide units and/or pentyleneoxide units or units of higher alkylene oxides.

In various embodiments, the number of alkyleneoxy units l is from 0 to 25, for example 6 to 20, for example 5 to 16, for example 8 to 10. These numbers are mean values of distributions.

In another embodiment, k is from 23 to 26 and l is from 5 to 30, for example from 5 to 28, for example from 5 to 25, for example from 7 to 23, for example from 7 to 18, for example from 8.5 to 17.25, with the proviso that the sum total of the carbon atoms in all hydrocarbyl radicals R$^3$ or R$^{3'}$ is from 15 to 60, for example from 15 to 56, for example from 15 to 50, for example from 25.5 to 34.5.

In an alternative embodiment, k is from 23 to 26 and l is from 8.5 to 17.25, with the proviso that the sum total of the carbon atoms in all hydrocarbyl radicals R$^3$ or R$^{3'}$ is from 25.5 to 34.5.

Alternatively, the optional $-(-CH_2-CH_2-O-)_m$ block is a polyethyleneoxy radical. The number of alkyleneoxy units m may be a number from 0 to 15, for example from 0 to 10, for example from 0.1 to 15, for example from 0.1 to 10, for example from 0.5 to 5, further for example from 0.5 to 2.5, The numbers mentioned are mean values of distributions.

In one embodiment, m is greater than 0. In particular, in this embodiment m is from 0.1 to 15, for example from 0.1 to 10, for example from 0.5 to 10, for example from 1 to 7, further for example from 2 to 5. The numbers mentioned are mean values of distributions.

In still other embodiments, the macromonomer may include a combination of two or more individual macromonomers, wherein each is independently as described herein. For examples, one macromonomer may be of the type wherein m=0 and a second macromonomer may be of the type wherein m=1 to 15, for example 1 to 10. In various embodiments, the weight ratio of the macromonomer wherein m=0 and of the macromonomer wherein m=1 to 15 is, for example, from 19:1 to 1:19, for example in the range from 9:1 to 1:9. These mixtures of macromonomers for example give rise to a mean value (averaged over all macromonomers in the mixture) from 0.1 to 15, for example 0.1 to 10, for example 0.5 to 5, for example 0.5 to 3, for example from 0.5 to 2.5. However, it is to be appreciated that the disclosure is not limited to this particular combination and any two combinations of macromonomers may be utilized herein.

In further embodiments, $R^4$ is H or an aliphatic hydrocarbyl radical having 1 to 30 carbon atoms, for example 1 to 10 and for example 1 to 5 carbon atoms. $R^4$ is, for example, H, methyl or ethyl, for example H or methyl and for example H.

The transition between the blocks may be abrupt or else continuous. In the case of a continuous transition, there is a transition zone including monomers of both blocks between the blocks. If the block boundary is fixed at the middle of the transition zone, the first block $-(-CH_2-CH_2-O-)_k$ may correspondingly have small amounts of units $-CH_2-CH(R^3)-O-$ and the second block $-(-CH_2-CH(R^3)-O-)_l-$ small amounts of units $-CH_2-CH_2-O-$, though these units are not distributed randomly over the block, but arranged within the transition zone mentioned. In various embodiments the optional third block $(-CH_2-CH_2-O-)_m$ may have small amounts of units $-(-CH_2-CH(R^3)-O-)-$.

In various embodiments the $(-CH_2-CH_2-O-)_k$ and $(-CH_2-CH(R^3)-O-)_l$ and optionally $-(-CH_2CH_2-O-)_m$ units may be arranged in block structure. The terminology "block structure" typically means that the blocks are formed from the corresponding units to an extent of at least 85 mol %, for example to an extent of at least 90 mol %, for example to an extent of at least 95 mol %, based on the total amount of the respective blocks. This means that the blocks, as well as the corresponding units, may have small amounts of other units (especially other polyalkyleneoxy units). In various embodiments the optional polyethyleneoxy block $-(-CH_2-CH_2-O-)_m$ includes at least 85 mol %, for example at least 90 mol %, based on the total amount of the polyethyleneoxy block $-(-CH_2-CH_2-O-)_m$, of the unit $(-CH_2-CH_2-O-)$. In various embodiments the optional polyethyleneoxy block $-(-CH_2-CH_2-O-)_m$ may include 85 to 95 mol % of the unit $(-CH_2-CH_2-O-)$ and of 5 to 15 mol % of the unit $(-CH_2-CH(R^3)-O-)$.

In various additional non-limiting embodiments, the components of the macromonomer are as follows. In one embodiment:

$R^2$: is independently a divalent linking group $-O-(C_{n'}H_{2n'})-$ where n' is from 2 to 6;

$R^3$: is independently a hydrocarbyl radical having 2 to 4 carbon atoms;

$R^4$: is H; or

In another embodiment:

k: is from 20 to 28;

l: is from 5 to 30, for example from 5 to 28, for example from 5 to 25;

m: is from 0 to 15, for example 0 or for example from 0.5 to 10;

$R^1$: is H;

$R^2$: is independently a divalent linking group $-O-(C_{n'}H_{2n'})-$ where n' is from 3 to 5, $R^3$: is independently a hydrocarbyl radical having 2 to 4 carbon atoms, with the proviso that the sum total of the carbon atoms in all hydrocarbyl radicals $R^3$ or $R^{3'}$ is from 15 to 60, for example from 5 to 56, for example from 15 to 50;

$R^4$: is H.

In another embodiment:

k: is from 23 to 26;

l: is from 5 to 30, for example from 5 to 28, for example from 5 to 25;

m: is from 0 to 15, for example 0 or for example from 0.5 to 10;

$R^1$: is H;

$R^2$: is independently a divalent linking group $-O-(C_{n'}H_{2n'})-$ where n' is from 3 to 5, $R^3$: is independently a hydrocarbyl radical having 2 to 4 carbon atoms, with the proviso that the sum total of the carbon atoms in all hydrocarbyl radicals $R^3$ or $R^{3'}$ is from 15 to 60, for example from 15 to 56, for example from 15 to 50;

$R^4$: is H.

In another embodiment:

k: is from 23 to 26;

l: is from 5 to 30, for example from 5 to 28, for example from 5 to 25;

m: is from 0.1 to 10, for example from 0.5 to 10, for example from 2 to 5;

$R^1$: is H;

$R^2$: is independently a divalent linking group $-O-(C_{n'}H_{2n'})-$ were n' is a natural number from 3 to 5, $R^3$: is independently a hydrocarbyl radical having 2 to 4 carbon atoms, with the proviso that the sum total of the carbon atoms in all hydrocarbyl radicals $R^3$ or $R^{3'}$ is from 15 to 60, for example from 15 to 56, for example from 15 to 50;

$R^4$: is H.

In another embodiment:

k: is from 23 to 26;

l: is from 8.5 to 17.25;

m: is from 0 to 15, for example 0 or for example from 0.5 to 10;

$R^1$: is H;

$R^2$: is independently a divalent linking group $-O-(C_{n'}H_{2n'})-$ where n' is from 3 to 5, $R^3$: is independently a hydrocarbyl radical having 2 to 4 carbon atoms, with the proviso that the sum total of the carbon atoms in all hydrocarbyl radicals $R^3$ or $R^{3'}$ is from 25.5 to 34.5;

$R^4$: is H.

In another embodiment:
k: is from 20 to 28;
l: is from 7.5 to 30, for example from 7.5 to 28, for example from 7.5 to 25, for example from 12.75 to 25, for example from 13 to 23, for example 14, 16 or 22;
m: is from 0 to 15; for example 0 or for example from 0.5 to 10;
$R^1$: is H;
$R^2$: is independently a divalent linking group —O—$(C_nH_{2n'})$ where n' is from 3 to 5,
$R^3$: is ethyl;
$R^4$: is H.

In another embodiment:
k: is from 23 to 26;
l: is from 7.5 to 30, for example from 7.5 to 28, for example from 7.5 to 25, for example from 12.75 to 25, for example from 13 to 23, for example 14, 16 or 22;
m: is from 0 to 15; for example 0 or for example from 0.5 to 10;
$R^1$: is H;
$R^2$: is independently a divalent linking group —O—$(C_nH_{2n'})$— where n' is from 3 to 5,
$R^3$: is ethyl;
$R^4$: is H.

In another embodiment:
k: is from 23 to 26;
l: is from 7.5 to 30, for example from 7.5 to 28, for example from 7.5 to 25, for example from 12.75 to 25, for example from 13 to 23, for example 14, 16 or 22;
m: is from 0.1 to 10, for example from 0.5 to 10, for example from 2 to 5;
$R^1$: is H;
$R^2$: is independently a divalent linking group —O—$(C_nH_{2n'})$— where n' is from 3 to 5,
$R^3$: is ethyl;
$R^4$: is H.

In another embodiment:
k: is from 23 to 26;
l: is from 12.75 to 17.25, especially from 13 to 17, for example 14 or 16;
m: is from 0 to 15; for example 0 or for example from 0.5 to 10;
$R^1$: is H;
$R^2$: is independently a divalent linking group —O—$(C_nH_{2n'})$— where n' is a natural number from 3 to 5,
$R^3$: is ethyl;
$R^4$: is H.

In another embodiment:
k: is from 23 to 26;
l: is from 8.5 to 11.5, for example from 9 to 11, for example 10 or 11;
m: is from 0 to 15, for example from 0 to 10; for example 0 or for example from 0.5 to 10;
$R^1$: is H;
$R^2$: is independently a divalent linking group —O—$(C_nH_{2n'})$— where n' is from 3 to 5,
$R^3$: is n-propyl;
$R^4$: is H.

In another embodiment:
k: is from 5 to 150, for example from 10 to 50, for example from 15 to 35, for example from 23 to 26;
l: is from 5 to 25, for example from 7 to 18, for example from 8.5 to 17.25;
m: is from 0 to 15, for example 0 to 10, for example from 0.1 to 10, for example from 0.5 to 5, for example 0.5 to 2.5;
$R^1$: is H or methyl;
$R^2$: is independently a single bond or a divalent linking group chosen from —$(C_nH_{2n})$— and —O—$(C_nH_{2n'})$—, where n is from 1 to 6 and n' is from 2 to 6;
$R^3$: is independently a hydrocarbyl radical having at least 2 carbon atoms, for example having 2 to 10, for example having 2 to 4 carbon atoms, or an ether group of the general formula —$CH_2$—O—$R^{3'}$ where $R^{3'}$ is a hydrocarbyl radical having at least 2 carbon atoms;
$R^4$: is independently H or a hydrocarbyl radical having 1 to 4 carbon atoms; obtainable by an above-described process according to the disclosure.

In another embodiment:
l: is from 5 to 30, for example from 5 to 28, for example from 5 to 25, for example from 7 to 23, for example from 7 to 18, for example from 8.5 to 17.25.

In another embodiment:
k: is from 10 to 150, for example from 10 to 50, for example from 15 to 35, for example from 20 to 28, for example from 23 to 26.

In another embodiment:
m: is from 0 to 15, for example from 0 to 10, for example from 0.1 to 10, for example from 0.5 to 5, for example from 0.5 to 3.5, for example from 0.5 to 2.5.

In another embodiment:
k: is from 20 to 28;
l: is from 5 to 30, for example from 5 to 28, for example from 5 to 25;
m: is from 0 to 15, for example 0 or for example from 0.5 to 10;
$R^1$: is H or methyl;
$R^2$: is independently a single bond or a divalent linking group chosen from —$(C_nH_{2n})$— and —O—$(C_nH_{2n'})$—, where n is from 1 to 6 and n' is from 2 to 6;
$R^3$: is independently a hydrocarbyl radical having at least 2 carbon atoms, for example having 2 to 4 carbon atoms, with the proviso that the sum total of the carbon atoms in all hydrocarbyl radicals $R^3$ is from 15 to 60, for example from 15 to 56, for example from 15 to 50;
$R^4$: is independently H or a hydrocarbyl radical having 1 to 4 carbon atoms.

In another embodiment:
k: is from 23 to 26;
l: is from 5 to 30, for example from 5 to 28, for example from 5 to 25;
m: is from 0 to 15, for example 0 or for example from 0.5 to 10;
$R^1$: is H or methyl;
$R^2$: is independently a single bond or a divalent linking group chosen from —$(C_nH_{2n})$— and —O—$(C_nH_{2n'})$—, where n is from 1 to 6 and n' is from 2 to 6;
$R^3$: is independently a hydrocarbyl radical having at least 2 carbon atoms, for example having 2 to 4 carbon atoms, with the proviso that the sum total of the carbon atoms in all hydrocarbyl radicals $R^3$ is from 15 to 60, for example from 15 to 56, for example from 15 to 50;
$R^4$: is independently H or a hydrocarbyl radical having 1 to 4 carbon atoms.

In another embodiment:
k: is from 23 to 26;
l: is from 8.5 to 17.25;
m: is from 0 to 15, for example 0 or for example 0.5 to 10;
$R^1$: is H or methyl;

$R^2$: is independently a single bond or a divalent linking group chosen from —$(C_nH_{2n})$— and —O—$(C_{n'}H_{2n'})$—, where n is from 1 to 6 and n' is from 2 to 6;

$R^3$: is independently a hydrocarbyl radical having at least 2 carbon atoms, for example having 2 to 4 carbon atoms, with the proviso that the sum total of the carbon atoms in all hydrocarbyl radicals $R^3$ is from 25.5 to 34.5;

$R^4$: is independently H or a hydrocarbyl radical having 1 to 4 carbon atoms.

In another embodiment:

k: is from 20 to 28;

l: is from 5 to 30, for example from 5 to 28, for example from 5 to 25;

m: is from 0 to 15, for example 0 or for example from 0.5 to 10;

$R^1$: is H;

$R^2$: is independently a divalent linking group —O—$(C_{n'}H_{2n'})$— where n' is from 3 to 5, $R^3$: is independently a hydrocarbyl radical having 2 to 4 carbon atoms, with the proviso that the sum total of the carbon atoms in all hydrocarbyl radicals $R^3$ is from 15 to 60, for example from 15 to 56, for example from 15 to 50;

$R^4$: is H.

In another embodiment:

k: is from 23 to 26;

l: is from 5 to 30, for example from 5 to 28, for example from 5 to 25;

m: is from 0 to 15, for example 0 or for example from 0.5 to 10;

$R^1$: is H;

$R^2$: is independently a divalent linking group —O—$(C_{n'}H_{2n'})$— where n' is from 3 to 5, $R^3$: is independently a hydrocarbyl radical having 2 to 4 carbon atoms, with the proviso that the sum total of the carbon atoms in all hydrocarbyl radicals $R^3$ is from 15 to 60, for example from 15 to 56, for example from 15 to 50;

$R^4$: is H.

In another embodiment:

k: is from 23 to 26;

l: is from 8.5 to 17.25;

m: is from 0 to 15, for example 0 or for example 0.5 to 10;

$R^1$: is H;

$R^2$: is independently a divalent linking group —O—$(C_{n'}H_{2n'})$— where n' is from 3 to 5, $R^3$: is independently a hydrocarbyl radical having 2 to 4 carbon atoms, with the proviso that the SUM total of the carbon atoms in all hydrocarbyl radicals $R^3$ is from 25.5 to 34.5;

$R^4$: is H.

In another embodiment:

k: is from 10 to 150, for example from 10 to 50, for example from 15 to 35, for example from 20 to 28, for example from 23 to 26;

l: is from 5 to 30, for example from 5 to 28, for example from 5 to 25, for example from 7 to 23, for example from 8.5 to 17.25;

m: is from 0 to 15, for example from 0 to 10, for example from 0.1 to 15, for example from 0.1 to 10, for example from 0.5 to 10, for example from 1 to 7, further for example from 2 to 5;

$R^1$: is H or methyl;

$R^2$: is independently a single bond or a divalent linking group chosen from —$(C_nH_{2n})$— and —O—$(C_{n'}H_{2n'})$—, where n is from 1 to 6 and n' is from 2 to 6;

$R^3$: is independently a hydrocarbyl radical having at least 2 carbon atoms, for example having 2 to 10, for example having 2 to 4, carbon atoms, for example ethyl and/or n-propyl, or an ether group of the general formula —$CH_2$—O—$R^{3'}$ where $R^{3'}$ is a hydrocarbyl radical having at least 2 carbon atoms;

$R^4$: is independently H or a hydrocarbyl radical having 1 to 4 carbon atoms.

In another embodiment:

m: is from 0.1 to 15, for example from 0.1 to 10, for example from 0.5 to 10, for example from 1 to 7, further for example from 2 to 5.

In another embodiment:

k: is from 20 to 28;

l: is from 5 to 30, for example from 5 to 28, for example from 5 to 25, for example from 7 to 23;

m: is from 0 to 15, for example from 0 to 10, for example from 0.1 to 15, for example from 0.1 to 10, for example from 0.5 to 10, for example from 1 to 7, further for example from 2 to 5.

$R^1$: is H;

$R^2$: is independently a divalent linking group —O—$(C_{n'}H_{2n'})$— where n' is from 3 to 5, $R^3$: is independently a hydrocarbyl radical having 2 or 3 carbon atoms; 20

$R^4$: is H.

In another embodiment:

k: is from 23 to 26;

l: is from 5 to 30, for example from 5 to 28, for example from 5 to 25, for example from 7 to 23;

m: is from 0 to 15, for example from 0 to 10, for example from 0.1 to 15, for example from 0.1 to 10, for example from 0.5 to 10, for example from 1 to 7, further for example from 2 to 5.

$R^1$: is H;

$R^2$: is independently a divalent linking group —O—$(C_{n'}H_{2n'})$ where n' is from 3 to 5, $R^3$: is independently a hydrocarbyl radical having 2 or 3 carbon atoms;

$R^4$: is H.

In another embodiment:

k: is from 23 to 26;

l: is from 8.5 to 17.25;

m: is from 0 to 15, for example 0 to 10, for example from 0.1 to 10, for example from 0.5 to 5, for example 0.5 to 2.5;

$R^1$: is H;

$R^2$: is independently a divalent linking group —O—$(C_{n'}H_{2n'})$— where n' is from 3 to 5, $R^3$: is independently a hydrocarbyl radical having 2 or 3 carbon atoms;

$R^4$: is H.

The macromonomer may be, or may be formed using the procedure, described in WO 2014/095608 (e.g. CA 2,892,689). Moreover, in various non-limiting embodiments, this disclosure may include one or more macromonomers or other components or method steps described in one or both of WO 2014/095608 (e.g. CA 2,892,689), each of which is expressly incorporated herein by reference in its entirety relative to these non-limiting embodiments.

In one embodiment, the macromonomer has the formula:

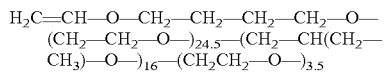

In another embodiment, the macromonomer has the formula:

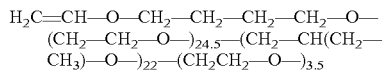

In a further embodiment, the macromonomer has the formula:

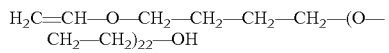

In yet another embodiment, the macromonomer has the formula:

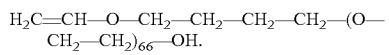

(C) Anionic Monoethylenically Unsaturated Monomer:

As first described above, the co-polymer (and typically the composition as a whole) are free of anionic monoethylenically unsaturated monomers both alone and as reactions products with (A) and/or (B). However, it is to be appreciated that acrylamide portions of the co-polymer may degrade in the composition (e.g. during storage), via hydrolysis, to form acrylic acid residues and/or anionic monoethylenically unsaturated monomer residues. Even in these cases, (C) is not part of the reaction product of (A) and (B) and instead is an non-desired contaminant formed by hydrolysis. If such residues are present in the composition, they are typically present in amounts of less than 5, 4, 3, 2, 1, 0.1, 0.05, 0.01, or 0.001, weight percent, based on a total weight of the co-polymer or based on the total weight of the composition.

For example, these anionic monoethylenically unsaturated monomers typically include at least one acidic group selected from the group consisting of —COOH, —SO$_3$H, PO$_3$H$_2$ and their salts. Examples of monomers including COOH groups include acrylic acid, methacrylic acid, crotonic acid, itaconic acid, maleic acid or fumaric acid. Examples of monomers including sulfonic acid groups include vinylsulfonic acid, allylsulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentane sulfonic acid. Examples of monomers including phosphonic acid groups include vinylphosphonic acid, allylphosphonic acid, N-(meth) acrylamidoalkylphosphonic acids or (meth) acryloyloxyalkylphosphonic acids. The acidic group is typically at least one acidic group selected from COOH groups and/or SO$_3$H groups. The acidic groups can, of course, be neutralized completely or partially, that is, they can be present as salts. Suitable counterions for the acidic group include, in particular, alkali metal ions, such as Li+, Na+ and K+ as well as ammonium ions NH$^{4+}$ and ammonium ions with organic radicals. Examples of ammonium ions with organic radicals include ammonium ions of the general formula [NHR$^{20}$R$^{21}$R$^{22}$]$^+$, where the radicals R$^{20}$, R$^{21}$, and R$^{22}$ are independent H or aliphatic and/or aromatic hydrocarbon radicals having 1 to 12, typically 1 to 6, carbon atoms, where the hydrocarbon radicals may be substituted by OH groups and/or non-adjacent carbon atoms may be substituted by O or N, provided that at least one of the radicals R$^{20}$, R$^{21}$, and R$^{22}$ is not H. They can also be ammonium ions of the general formula [R$^{20}$R$^{21}$HN—R$^{23}$NHR$^{20}$R$^{21}$]$^{2+}$ where R$^{20}$ and R$^{21}$ have the abovementioned meaning and R$^{23}$ is an alkylene radical having 1 to 6 carbon atoms, typically a 1, ω-alkylene radical having 2 to 6 carbon atoms. Examples of ammonium ions with organic radicals include [NH(CH$_3$)$_3$]$^+$, [NH$_2$(CH$_3$)$_2$]$^+$, [NH$_3$(CH$_3$)]$^+$, [NH(C$_2$H$_5$)$_3$]$^+$, [NH$_2$(C$_2$H$_5$)$_2$]$^+$, [NH$_3$(C$_2$H$_5$)]$^+$, [NH$_3$(CH$_2$CH$_2$OH)]$^+$, [H$_3$N—CH$_2$CH$_2$—NH$_3$]$^{2+}$, or [H(H$_3$C)$_2$N—CH$_2$CH$_2$CH$_2$NH$_3$]$^{2+}$. Typical counterions are Li+, Na+ or K+, or NH$_4^+$, e.g. NH+ or NH$^{4+}$. Mixtures of counterions are also included in the above list. Salts can be obtained by completely or partially neutralizing monomers the aforementioned monomer in the acid form before the polymerization with the corresponding bases. The monomers in the acid form and completely or partially neutralize acid groups resulting therefrom are also included. In various embodiments, the composition and co-polymer are free of reaction products of acrylic acid (acrylic acid monomer) which is alternatively described as prop-2-enoic acid and has the formula CH$_2$=CHCO$_2$H.

(D) AMPS:

The co-polymer and the composition as a whole) is also typically free of 2-acrylamido-2-methylpropane sulfonic acid (2-acrylamido-2-methylpropane sulfonic acid monomer) which is also known as 2-Acrylamido-2-methyl-1-propane sulfonic acid or AMPS and has the formula C$_7$H$_{13}$NO$_4$S. This compound is also known as ATBS or acrylamido ter-butyl sulfonic acid.

Additive:

The composition may also include one or more additives, which are optional for use. Various additives include stabilizers, spreading agents, wetting agents, building agents, extending agents, emulsifiers, defoamers, salts such as MgCl$_2$, CaCl$_2$ and the like, glycerin, high fructose corn syrup, citric acid, alkylpolyglycosides, ethoxylated alcohols (having any known E/O mol value), defoamers, dispersants, suspending agents, plant penetrants, translocators, oils, activators, foliar nutrients, compatibility agents, drift retardants, foam retardants, buffers, inverting agents, soil penetrants, stabilizing agents, UV filters, feeding stimulants, washing agents, sinking agents, binders, liquid carriers, dry carriers such as attapulgite, kaolinite, vermiculite, starch polymers, corn cob, and combinations thereof. The composition may also include additional chemical compounds that are not pesticides. Examples include, but are not limited to, activators, anti-feedants, anti-fouling agents, attractant agents, chemosterilants, disinfectant agents, fumigant agents, pheromones, repellent agents, defoliants, desiccants, insect growth regulators, plant growth regulators, synergists, adjuvants, and combinations thereof.

In various embodiments, one or more additives may be independently present in the composition in an amount from 0 to 50, from 5 to 50, from 10 to 35, from 15 to 30, from 5 to 10, parts by weight per 100 parts by weight of the composition. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10, %.

Alkyl Polyglycoside:

The composition may include an alkyl polyglycoside which may be present in an amount from 1 to 20 parts by weight per 100 parts by weight of the composition. In various embodiments, the alkyl polyglycoside is present in an amount of 1, 2, 3, 4, 5, 6, 7, 8, 9, 10, 11, 12, 13, 14, 15, 16, 17, 18, 19, or 20, parts by weight per 100 parts by weight of the composition. In various non-limiting embodiments, all values and ranges of values between and including the aforementioned values are hereby expressly contemplated.

In various embodiments, any one or more of the aforementioned amount(s) may vary by ±1, 2, 3, 4, 5, 6, 7, 8, 9, or 10, %.

The alkyl poly-glycoside is not for example limited and may be any in the art. In various embodiments the alkyl polyglycoside may be further defined as an alkyl polyglycoside of a $C_8$-$C_{16}$ alcohol or combination of such alcohols. In other embodiments, the alkyl polyglycoside is further defined as an alkyl polyglycoside of a $C_{10}$-$C_{16}$ alcohol or combination of such alcohols. In further embodiments, the alkyl polyglycoside is further defined as an alkyl polyglycoside of a $C_8$-$C_{16}$ alcohol or combination of such alcohols. In various embodiments, the alkyl polyglycoside includes an alkyl polyglycoside of a $C_8$-$C_{10}$ alcohol, an alkyl polyglycoside of a $C_{12}$-$C_{14}$ alcohol, an alkyl polyglycoside of a $C_8$-$C_{16}$ alcohol, an alkyl polyglycoside of a $C_9$-$C_{11}$ alcohol, or combinations thereof.

In still other embodiments, the alkyl polyglycoside has the formula R'OG$_y$, wherein R' is a $C_6$ to $C_{18}$ linear or branched alkyl alcohol group, G is a glycoside, and y is an average degree of polymerization, wherein y is a number greater than 0 and up to 3. In this formula, R' is a $C_6$ to $C_{18}$ linear or branched alkyl alcohol group. However, R' may have any number or range of numbers from 8 to 18 relative to the number of carbon atoms. In various embodiments, R' is a $C_8$ to $C_{16}$, $C_8$ to $C_{14}$, $C_8$ to $C_{12}$, $C_8$ to $C_{10}$, $C_{10}$ to $C_{18}$, $C_{10}$ to $C_{16}$, $C_{10}$ to $C_{14}$, $C_{10}$ to $C_{12}$, $C_{12}$ to $C_{18}$, $C_{12}$ to $C_{16}$, $C_{12}$ to $C_{14}$, $C_{14}$ to $C_{18}$, $C_{14}$ to $C_{18}$, or $C_{16}$ to $C_{18}$, linear or branched alkyl group. Moreover, G is a glycoside. The glycoside may be a molecule wherein a sugar is bound to another functional group via a glycosidic bond. More specifically, the glycoside may be a sugar group that is bonded through its anomeric carbon to another group via a glycosidic bond. Glycosides can be linked by an O— (an O-glycoside), N— (a glycosylamine), S— (a thloglycoside), or C— (a C-glycoside) glycosidic bond. The glycoside may be alternatively described as a "glycosyl compound." In some embodiments, the sugar is bonded to a non-sugar thus excluding polysaccharides. In such embodiments, the sugar group can be described as a glycone and the non-sugar group as an aglycone. The glycone can be a single sugar group (a monosaccharide) or several sugar groups (an oligosaccharide). In one embodiment, the sugar or glycone group is, or is based on, glucose. Furthermore, y is an average degree of polymerization and is a number greater than 0 and up to 3 (i.e., 0<y≤3), or any value or range of values therebetween. In various embodiments, y is 1.1 to 2, 1.2 to 1.9, 1.3 to 1.8, from 1.4 to 1.7, from 1.5 to 1.6, from 1.2 to 1.7, etc. In various non-limiting embodiments, all values and ranges of values between and including the aforementioned values are hereby expressly contemplated. Non-limiting examples of suitable alkyl polyglycosides are commercially available under the trade names Agnique® PG 264, Agnique® PG 8105, Agnique® PG 8107, Agnique® PG 9116, and Agnique® PG 8166.

Emulsifier:

The composition may also include an emulsifier. The emulsifier may be an anionic emulsifier and/or a non-ionic emulsifier. The anionic emulsifier may be any known in the art and for example includes alkali, alkaline earth or ammonium salts of fatty acids, such as potassium stearate, alkyl sulfates, alkyl ether sulfates, alkylsulfonates or iso-alkylsulfonates, alkylnaphthalenesulfonates, alkyl methyl ester sulfonates, acyl glutamates, alkylsulfosuccinates, sarcosinates such as sodium lauroyl sarcosinate or taurates, and combinations thereof. In one embodiment, the anionic emulsifier is a calcium dodecylbenzene sulfonate (DDBSA) such as Ninate 401 A, Agnique® ABS 60, and Agnique® ABS 70C. In various embodiments, the emulsifier may be present in an amount from 0 to 20, 5 to 15, 5 to 10, 10 to 15, 15 to 20, parts by weight per 100 parts by weight of the composition. Of course, it is to be understood that the instant disclosure is not limited to the aforementioned values and that the emulsifier may be present in any whole or fractional amount or range of amounts within the aforementioned values. In various embodiments, any one or more of the aforementioned amount(s) may vary by ±1, 2, 3, 4, 5, 6, 7, 8, 9, or 10, %.

The non-ionic emulsifier may be any known in the art and may include alkoxylated animal or vegetable fats and oils such as corn oil ethoxylates, soybean oil ethoxylates, castor oil ethoxylates, tallow fatty ethoxylates, glycerol esters such as glycerol monostearate, fatty alcohol alkoxylates and oxoalcohol alkoxylates, fatty acid alkoxylates such as oleic acid ethoxylates, alkylphenol alkoxylates such as isononylphenol ethoxylates, fatty amine alkoxylates, fatty acid amide alkoxylates, sugar surfactants such as sorbitan fatty acid esters (e.g. sorbitan monooleate, and sorbitan tristearate), polyoxyethylene sorbitan fatty acid esters, alkyl polyglycosides, N-alkylgluconamides, and combinations thereof.

Optional Solvent:

The composition may also include an optional solvent or solvent component. In various embodiments, the solvent or solvent component may be present in an amount of greater than zero up to an amount of 90 (e.g. 0<amount≤90), greater than zero up to an amount of 80 (0<amount≤80), from 5 to 75, from 10 to 70, from 15 to 65, from 20 to 60, from 25 to 55, from 30 to 50, from 35 to 45, or from 40 to 45, parts by weight per 100 parts by weight of the composition. Of course, it is to be understood that the instant disclosure is not limited to the aforementioned values and that the solvent component may be present in any whole or fractional amount or range of amounts within the aforementioned values. In various embodiments, any one or more of the aforementioned amount(s) may vary by ±1, 2, 3, 4, 5, 6, 7, 8, 9, or 10, %.

The optional solvent may be any known in the art. In one embodiment the solvent is organic. In various embodiments the solvent may be chosen from $C_{10}$-$C_{12}$ alkyl benzenes, N, N-dimethyl lactamide, and combinations thereof. In other embodiments, the solvent is chosen from solvents such as Agnique® AMD810, Aromatic solvents (100, 150), methyl esters, fatty alcohols, oxo-alcohols, and combinations thereof. In other embodiments, the optional solvent is chosen from Acetic Anhydride; Acetone; α-Alkyl $C_9$-$C_{18}$ ω-hydroxypoly (oxyethylene) 2-20 moles; α-Alkyl C6-C14-ω-hydroxypoly (oxypropylene) block co-polymer with polyoxyethylene (POP content is 1-3 moles and POE content is 4-12 moles, weight average molecular weight 635); Amyl acetate; Butanol; Cod Liver Oil; Dipropylene Glycol; Ethyl acetate; Ethyl Alcohol; Ethyl Esters of fatty acids derived from edible fats and oils; 2-Ethyl-1-Hexanol; Glycerol monoacetate (monoacetin); Glycerol di-acetate (diacetin); Glycerol tri-acetate (triacetin); Hexyl Alcohol; Hydrochloric acid; isopropyl Myristate; Lactic Acid; Lactic acid, 2-ethylhexyl ester; Lactic acid, 2-ethylhexyl ester, (2S)-Lactic acid, n-propyl ester; (S)-Limonene; Methyl Alcohol; Methyl n-Amyl Ketone; Methyl Esters of fatty acids derived from edible fats and oils; Methyl isobutyl ketone; Mineral Oil, USP; Oleyl alcohol; Petroleum Hydrocarbons, light odorless conforming to 21 CFR 172.884 Petroleum Hydrocarbons, synthetic isoparaffinic conforming to 21 CFR 172.882; Propanol; Propylene glycol; Soybean oil derived fatty acids; Xylene meeting specifications set in 21 CFR 172.884 (b) (4); and combinations thereof.

In various embodiments, the composition may be as follows:

| | |
|---|---|
| Pesticide: | 0.001 to 5.00 grams; 0.1 to 2.5 grams; 0.5 to 1.5 grams ±0.0005 grams |
| Water: | 10 to 85 grams; 25 to 85 grams; 50 to 85 grams; ±5 grams |
| Viscosity Modifier: (e.g. $MgCl_2$ and/or $CaCl_2$) | 0 to 3 grams; 1 to 3 grams; 1.5 to 2.5 grams; ±0.5 grams |
| Dispersion Additive: (e.g. glycerin) | 0 to 15 grams; 5 to 15 grams; 8 to 12 grams; ±1 gram |
| pH Controller: (e.g. citric acid) | 0 to 3 grams; 1 to 3 grams; 2 to 3 grams; ±0.5 grams |
| Compatibility Additive: (e.g. alkyl polyglycoside) | 0 to 5 grams; 1 to 5 grams; 2 to 4 grams; ±0.5 grams |
| Wetting Agent: (e.g. ethoxylated alcohol) | 0 to 5 grams; 1 to 5 grams; 2 to 4 grams; ±0.5 grams |
| Defoamer: | 0 to 1 gram; 0.25 to 1 gram; 0.25 to 0.75 grams; ±0.25 grams |
| Co-polymer | 0.00002 to 3 grams; 1 to 3 grams; 1 to 2 grams; ±0.00001 grams |

In various non-limiting embodiments, all values and ranges of values between and including the aforementioned values are hereby expressly contemplated. Moreover, it is also contemplated that any one or more of the viscosity modifier, the dispersion additive, the PH controller, the compatibility additive, the wetting agent, and the defoamer is optional any may not be included.

Emulsifiable Concentrate:

This disclosure also provides the composition as an emulsifiable concentrate (also known in the art as an "EC"). In various embodiments, the emulsifiable concentrate is a liquid that has a viscosity from 1 to 200, 50 to 200, 100 to 200, or less than or equal to about 200, cps at 25° C. Without intending to be bound by any particular theory, it is believed that a viscosity of less than or equal to about 200 cps at 25° C. promotes blooming and efficient formation of an emulsion when the concentrate is used. In various embodiments, any one or more of the aforementioned amount(s) may vary by ±1, 2, 3, 4, 5, 6, 7, 8, 9, or 10, %.

The concentrate is typically a single phase liquid. In other words, the concentrate does not typically include a distinct non-polar phase and a distinct polar phase but instead typically includes a single phase that includes the pesticide, water, and co-polymer, and optionally one or more additives. Of course, it is to be appreciated that the single phase may include partial phase separation but does not typically include total phase separation. At low temperatures, phase separation may occur. The concentrate may be described as including or being the aforementioned emulsifier component and the pesticide (e.g. without the optional solvent).

The concentrate may include, be, consist essentially of, or consist of, the pesticide, the co-polymer, and one or more additives. Alternatively, the concentrate may include, be, consist essentially of, or consist of, the combination of the pesticide and the co-polymer. Further, the concentrate may be, consist essentially of, or consist of, the combination of the co-polymer and one or more additives. The terminology "consist essentially of" describes embodiments that are free of other (co-)polymers different from the co-polymer, and/or one or more additives, such as any one or more additives described herein, and/or one or more pesticides different from the aforementioned pesticide. In such "consisting essentially of" embodiments, the concentrate may be free of any additive, pesticide, or polymer known in the art. Moreover, it is contemplated that some water may be present in the concentrate or may be absent, as described below.

The concentrate itself can be, for example, anhydrous, i.e., free of water. Alternatively, the concentrate may include water, which may be of any type above. In various embodiments, the concentrate may include less than 5, less than 2.5, less than 1, less than 0.5, or less than 0.1, parts by weight of water per 100 parts by weight of the concentrate. In other embodiments, the concentrate may include less than 15, 14, 13, 12, 11, 10, 9, 8, 7, 6, 5, 4, 3, 2, or 1, part by weight of water per 100 parts by weight of the concentrate. In various embodiments the concentrate is a single oil-like, e.g. hydrophobic, phase that does not include water. When added to water or another solvent, the concentrate for example forms a milky white agricultural emulsion that blooms and that has little to no phase separation, as is described in greater detail below. In various embodiments, any one or more of the aforementioned amount(s) may vary by ±1, 2, 3, 4, 5, 6, 7, 8, 9, or 10, %.

In various embodiments, the concentrate may include the co-polymer and optionally one or more additives described above and may be combined with water to form an emulsion and/or the aforementioned composition. In various embodiments the co-polymer may be present in the concentrate in an amount of from 1 to 99, 5 to 95, 10 to 90, 15 to 85, 20 to 80, 25 to 75, 30 to 70, 35 to 65, 40 to 60, 45 to 55, or 45 to 50, weight percent based on a total weight of the concentrate. Moreover, the one or more additives may independently be present in any one of the aforementioned amounts or ranges. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10, %.

The concentrate may include any one or more of any of the aforementioned components described anywhere in this disclosure. For example, in various embodiments, the concentrate includes one or more additives in an amount of from 0 to 15, from 0 to 10, or from 0 to 5, weight percent based on a total weight of the concentrate. In other embodiments, the concentrate includes one or more pesticides in an amount of from 0.01 to 85, from 0.1 to 85, from 0.1 to 60, or from 1 to 8, weight percent based on a total weight of the concentrate. In various non-limiting embodiments, all values and ranges of values between and including the aforementioned values are hereby expressly contemplated. In various embodiments, any one or more of the aforementioned amount(s) may vary by ±1, 2, 3, 4, 5, 6, 7, 8, 9, or 10, %

Agricultural Emulsion:

Referring back, the emulsion may be the composition itself or may be different from the composition. For example, well-formed emulsions are milky in color, spontaneously bloom (i.e., form), and have sufficient stability for efficacious application, as would be understood by those of skill in the art. As such, the composition may be used to form the emulsion. However, emulsions of this disclosure are not limited to such parameters and may have other characteristics that are indicative of successful emulsion formation.

It is further contemplated that the composition may be water soluble. Alternatively, the composition may be water dispersible. Accordingly, the composition may be defined more broadly or more narrowly than as described above relative to an emulsion or concentrate.

Methods:

This disclosure also provides a method of forming the composition. The method includes the step of combining the pesticide, the water, and the co-polymer. This step may also include adding any additives described above. The aforementioned components and compounds may be added in any order to one or more of each other and in any amount and in one or more individual steps, e.g. in whole or in parts.

This disclosure further provides a method of forming the concentrate. The method may include the step of combining the co-polymer and one or more optional additives. Alternatively, the method may include the step of combining the pesticide, the co-polymer, and one or more optional additives. Further, the method may include the step of combining the pesticide and the co-polymer. The aforementioned components and compounds may be added in any order to one or more of each other and in any amount and in one or more individual steps, e.g. in whole or in parts.

This disclosure further provides a method of forming the emulsion. The method may include the step of combining the pesticide, the co-polymer, the water, and one or more additives. Alternatively, the method may include the step of combining the composition and one or more additives or optional solvents or additional water to form the emulsion. The aforementioned components and compounds may be added in any order to one or more of each other and in any amount and in one or more individual steps, e.g. in whole or in parts.

This disclosure further provides a method of applying the composition to an agricultural target wherein the method includes the step of spraying the composition. The agricultural target may be any known in the art of pesticide applications and may be, for examples, weeds, crops, fields, plants, etc. In one embodiment, the agricultural target is a weed. In another embodiment, the agricultural target is a crop. In a further embodiment, the agricultural target is a field. In another embodiment, the agricultural target is a plant. In a further embodiment, the agricultural target is turf. In yet another embodiment, the agricultural target is a horticultural target. Moreover, the agricultural target may be grass or a field or a pasture. The agricultural target may be associated with a residential or commercial application.

Moreover, the step of spraying may utilize a spray nozzle and may be further defined to include any parameters known in the art of spraying pesticides. The spray nozzle may be any known in the art such as a TeeJet® 8002VS, or any other suitable nozzle as would be recognized by one of skill in the art.

EXAMPLES

A series of Compositions that represent various embodiments of this disclosure are formed. A series of Comparative Compositions are also formed.

Each of the Compositions and Comparative Compositions are tested using ASTM E2798-11 and a Malvern Spray Tech droplet analyzer to determine a percentage reduction in "fines", as is understood in the art. The "fines" represent fine droplets having a volume percent of spray droplets (% V)<141 μm. The nozzle used is a TeeJet® 8002VS nozzle.

The Compositions and Comparative Compositions are set forth below in Tables 1-5 along with the results.

TABLE 1

|  | CCP1 | CCP2 | CP3 | CP4 | CP5 | CP6 | CP7 | CP8 | CP9 |
|---|---|---|---|---|---|---|---|---|---|
| Acrylamide | 69.00 | 68.00 | 99.50 | 99.40 | 99.00 | 98.50 | 98.00 | 97.00 | 97.00 |
| Macro Monomer 1 | 1.00 | 2.00 | 0.50 | — | 1.00 | 1.50 | 2.00 | — | — |
| Macro Monomer 2 | — | — | — | 0.60 | — | — | — | — | — |
| Macro Monomer 3 | — | — | — | — | — | — | — | 3.00 | — |
| Macro Monomer 4 | — | — | — | — | — | — | — | — | 3.00 |
| AMPS | 30.00 | 30.00 | — | — | — | — | — | — | — |
| Acrylic Acid | — | — | — | — | — | — | — | — | — |

CCP1 and CCP2 are Comparative Copolymers 1 and 2, respectively, and are not representative of this disclosure.

CP3-CP9 are Copolymers 3-9, respectively, and are representative of various embodiments of this disclosure.

Macromonomer 1 has the following formula:

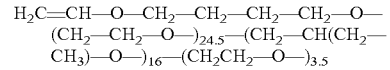

Macromonomer 2 has the following formula:

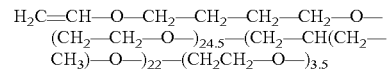

Macromonomer 3 has the following formula:

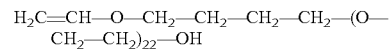

Macromonomer 4 has the following formula:

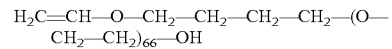

The data set forth above shows that agricultural compositions of this disclosure reduce driftable fines when compared to both water only sprays and water/copolymer only sprays

TABLE 2

|  | Pesticide Std. 1 | Compar. Comp. 1a | Compar. Comp. 2a | Comp. 3a | Comp. 4a | Comp. 5a | Comp. 7a |
|---|---|---|---|---|---|---|---|
| Tap Water | 98.3 | 98.2875 | 98.2875 | 98.2875 | 98.2875 | 98.2875 | 98.2875 |
| RoundUp PowerMax | 1.7 | 1.7 | 1.7 | 1.7 | 1.7 | 1.7 | 1.7 |
| CCP1 | — | 0.0125 | — | — | — | — | — |
| CCP2 | — | — | 0.0125 | — | — | — | — |
| CP3 | — | — | — | 0.0125 | — | — | — |
| CP4 | — | — | — | — | 0.0125 | — | — |
| CP5 | — | — | — | — | — | 0.0125 | — |
| CP7 | — | — | — | — | — | — | 0.0125 |

TABLE 2-continued

| | Pesticide Std. 1 | Compar. Comp. 1a | Compar. Comp. 2a | Comp. 3a | Comp. 4a | Comp. 5a | Comp. 7a |
|---|---|---|---|---|---|---|---|
| % V < 141 μm | 44.87% | N/A | 14.80% | 8.13% | 6.12% | 6.61% | 7.25% |
| % Reduction Over Pesticide Std. 1 | — | N/A | 67% | 82% | 86% | 85% | 84% |

TABLE 3

| | Pesticide Std. 2 | Compar. Comp. 1b | Compar. Comp. 2b | Comp. 3b | Comp. 4b |
|---|---|---|---|---|---|
| Tap Water | 98.3 | 98.2875 | 98.2875 | 98.2875 | 98.2875 |
| Liberty 280 SL | 1.3 | 1.3 | 1.3 | 1.3 | 1.3 |
| CCP1 | — | 0.0125 | — | — | — |
| CCP2 | — | — | 0.0125 | — | — |
| CP3 | — | — | — | 0.0125 | — |
| CP4 | — | — | — | — | 0.0125 |
| CP5 | — | — | — | — | — |
| CP7 | — | — | — | — | — |
| CP8 | — | — | — | — | — |
| CP9 | — | — | — | — | — |
| % V < 141 μm | 42.96% | 27.06% | 4.30% | 4.83% | 5.85% |
| % Reduction Over Pesticide Std. 2 | — | 37% | 90% | 89% | 86% |

| | Pesticide Std. 2 | Comp. 5b | Comp. 7b | Comp. 8b | Comp. 9b |
|---|---|---|---|---|---|
| Tap Water | 98.3 | 98.2875 | 98.2875 | 98.2875 | 98.2875 |
| Liberty 280 SL | 1.3 | 1.3 | 1.3 | 1.3 | 1.3 |
| CCP1 | — | — | — | — | — |
| CCP2 | — | — | — | — | — |
| CP3 | — | — | — | — | — |
| CP4 | — | — | — | — | — |
| CP5 | — | 0.0125 | — | — | — |
| CP7 | — | — | 0.0125 | — | — |
| CP8 | — | — | — | 0.0125 | — |
| CP9 | — | — | — | — | 0.0125 |
| % V < 141 μm | 42.96% | 5.53% | 8.40% | 8.13% | 11.57% |
| % Reduction Over Pesticide Std. 2 | — | 87% | 80% | 81% | 73% |

Liberty 280 SL® is an herbicide that is commercially available from Bayer.

TABLE 4

| | Pesticide Std. 3 | Compar. Comp. 1c | Compar. Comp. 2c | Comp. 3c | Comp. 4c |
|---|---|---|---|---|---|
| Tap Water | 98.3 | 98.9375 | 98.9375 | 98.9375 | 98.9375 |
| Headline | 1.05 | 1.05 | 1.05 | 1.05 | 1.05 |
| CCP1 | — | 0.0125 | — | — | — |
| CCP2 | — | — | 0.0125 | — | — |
| CP3 | — | — | — | 0.0125 | — |
| CP4 | — | — | — | — | 0.0125 |
| CP5 | — | — | — | — | — |
| CP7 | — | — | — | — | — |
| CP9 | — | — | — | — | — |
| % V < 141 μm | 27.61% | 6.15% | 6.91% | 18.28% | 18.78% |
| % Reduction Over Pesticide Std. 3 | — | 78% | 75% | 34% | 32% |

| | Pesticide Std. 3 | Comp. 5c | Comp. 7c | Comp. 9c |
|---|---|---|---|---|
| Tap Water | 98.3 | 98.9375 | 98.9375 | 98.9375 |
| Headline | 1.05 | 1.05 | 1.05 | 1.05 |
| CCP1 | — | — | — | — |
| CCP2 | — | — | — | — |
| CP3 | — | — | — | — |
| CP4 | — | — | — | — |
| CP5 | — | 0.0125 | — | — |
| CP7 | — | — | 0.0125 | — |
| CP9 | — | — | — | 0.0125 |
| % V < 141 μm | 27.61% | 13.85% | 16.43% | 20.17% |
| % Reduction Over Pesticide Std. 3 | — | 50% | 40% | 27% |

TABLE 5

| | Pesticide Std. 4 | Compar. Comp. 1d | Compar. Comp. 2d | Comp. 3d | Comp. 4d |
|---|---|---|---|---|---|
| Tap Water | 98.3 | 98.9375 | 98.9375 | 97.4875 | 97.4875 |
| Remedy Ultra | 2.5 | 2.5 | 2.5 | 2.5 | 2.5 |
| CCP1 | — | 0.0125 | — | — | — |
| CCP2 | — | — | 0.0125 | — | — |
| CP3 | — | — | — | 0.0125 | — |
| CP4 | — | — | — | — | 0.0125 |
| CP6 | — | — | — | — | — |
| CP7 | — | — | — | — | — |
| CP9 | — | — | — | — | — |
| % V < 141 μm | 26.53% | 3.86% | 29.52% | 18.47% | 13.95% |
| % Reduction Over Pesticide Std. 4 | — | 85% | 0% | 30% | 47% |

| | Pesticide Std. 4 | Comp. 6d | Comp. 7d | Comp. 9d |
|---|---|---|---|---|
| Tap Water | 98.3 | 97.4875 | 97.4875 | 97.4875 |
| Remedy Ultra | 2.5 | 2.5 | 2.5 | 2.5 |
| CCP1 | — | — | — | — |
| CCP2 | — | — | — | — |
| CP3 | — | — | — | — |
| CP4 | — | — | — | — |
| CP6 | — | 0.0125 | — | — |
| CP7 | — | — | 0.0125 | — |
| CP9 | — | — | — | 0.0125 |
| % V < 141 μm | 26.53% | 12.31% | 22.68% | 16.26% |
| % Reduction Over Pesticide Std. 4 | — | 54% | 15% | 39% |

The data set forth in Table 2 demonstrates that Co-Polymers 3, 4, 5 and 7, co-polymers that are representative embodiments of this disclosure, provide significant reduction of driftable fines (droplets<141 um) when compared with RoundUp® PowerMax alone (Pesticide Std. 1) and improved reduction in driftable fines (droplets<141 um) when compared to Comparative Co-Polymer 1 and Comparative Co-Polymer 2. Comparative Co-Polymer 1 is in fact incompatible with RoundUp® PowerMax and could not be tested.

The data set forth in Table 3 demonstrates that Co-Polymers 3, 4, 5, 7, 8 and 9, co-polymers that are representative embodiments of this disclosure, provide significant reduction of driftable fines (droplets<141 um) with Liberty®

280 SL alone (Pesticide Std. 2) and improved reduction in driftable fines (droplets<141 um) when compared to Comparative Co-Polymer 1.

The data set forth in Table 4 demonstrates that Co-Polymers 3, 4, 5, 7 and 9, co-polymers that are embodiments of this disclosure, provide significant reduction of driftable fines (droplets<141 um) with Headline® alone (Pesticide Std. 3).

The data set forth in Table 5 demonstrates that Co-Polymers 3, 4, 6, 7 and 9, co-polymers that are embodiments of this disclosure, provide significant reduction of driftable fines (droplets<141 um) with Remedy Ultra alone (Pesticide Std. 4) and improved reduction in drillable fines (droplets<141 um) when compared to Comparative Co-Polymer 2.

In the examples, Co-Polymers 3, 4, 5, 6, 7, 8 and 9, all representative embodiments of this disclosure, reduce the percentage of driftable fines as defined by droplets<141 um when compared to standard pesticide/water compositions. This reduction held true for SL formulations (ionic, soluble liquids) as represented by RoundUp® PowerMax and Liberty® 280 SL, for SC formulations (dispersible, aqueous suspensions) as represented by Headline® and for EC formulations (emulsifiable, organic solvent based liquids) as represented by Remedy Ultra.

Furthermore, the examples in Tables 2-5 demonstrate effective reduction of driftable droplets (<141 um) with Co-Polymers with a varied range of weight percent of the Macromonomer (Co-Polymer 3: 0.5% Macromonomer, Co-Polymer 5: 1.0% Macromonomer, Co-Polymer 6: 1.5% Macromonomer, Co-Polymer 7: 2.0% Macromonomer, and Co-Polymers 8 and 9: 3.0% Macromonomer).

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure. In various non-limiting embodiments, all values and ranges of values between and including the aforementioned values are hereby expressly contemplated.

One or more of the values described above may vary by ±5%, ±10%, ±15%, ±20%, ±25%, etc. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. An aqueous agricultural composition comprising a pesticide, water, and a co-polymer in an amount of from 0.01 to 0.05 weight percent based on a total weight of the aqueous agricultural composition, the co-polymer comprising:
   A. 90 to 99.9 weight percent of an acrylamide monomer; and
   B. 0.1 to 10 weight percent of a macromonomer having the formula:

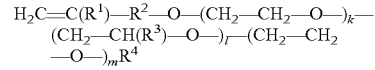

wherein
   k is from 5 to 150;
   l is from 0 to 25;
   m is from 0 to 15;
   $R^1$ is H or methyl;
   $R^2$ is independently a single bond or a divalent linking group chosen from $-(C_nH_{2n})-$ and $-O-(C_{n'}H_{2n'})-$, wherein n is from 1 to 6 and n' is from 2 to 6;
   $R^3$ is independently a hydrocarbyl radical having at least 2 carbon atoms or an ether group of the general formula $-CH_2-O-R^{3'}$ where $R^{3'}$ is a hydrocarbyl radical having at least 2 carbon atoms; and
   $R^4$ is independently H or a hydrocarbyl radical having 1 to 4 carbon atoms,
   wherein the co-polymer is free of (C) an anionic monoethylenically unsaturated monomer comprising at least one acidic group chosen from $-COOH$, $-SO_3H$, $-PO_3H_2$ and salts thereof.

2. The aqueous agricultural composition of claim 1 wherein said (A) acrylamide monomer is chosen from (meth) acrylamide, N-methyl (meth) acrylamide, N, N'-dimethyl (meth) acrylamide, N-methylol (meth) acrylamide, or combinations thereof.

3. The aqueous agricultural composition of claim 1 wherein said (A) acrylamide monomer is acrylamide.

4. The aqueous agricultural composition of claim 1 wherein:
   k is from 10 to 150;
   l is from 5 to 25;
   m is from 0 to 15;
   $R^1$ is H or methyl;
   $R^2$ is independently a single bond or a divalent linking group chosen from $-(C_nH_{2n})-$ and $-O-(C_nH_{2n'})-$, wherein n is from 1 to 6 and n' is from 2 to 6;
   $R^3$ is independently a hydrocarbyl radical having at least 2 carbon atoms or an ether group of the general formula $-CH_2-O-R^{3'}$ where $R^{3'}$ is a hydrocarbyl radical having at least 2 carbon atoms; and
   $R^4$ is independently H or a hydrocarbyl radical having 1 to 4 carbon atoms.

5. The aqueous agricultural composition of claim 1 wherein said (B) macromonomer has the formula:

$$H_2C=CH-O-CH_2-CH_2-CH_2-CH_2-O-(CH_2-CH_2-O-)_{24.5}-(CH_2-CH(CH_2-CH_3)-O-)_{16}-(CH_2CH_2-O-)_{3.5}.$$

6. The aqueous agricultural composition of claim 1 wherein said (B) macromonomer has the formula:

$$H_2C=CH-O-CH_2-CH_2-CH_2-CH_2-O-(CH_2-CH_2-O-)_{24.5}-(CH_2-CH(CH_2-CH_3)-O-)_{22}-(CH_2CH_2-O-)_{3.5}.$$

7. The aqueous agricultural composition of claim 1 wherein said (B) macromonomer has the formula:

$$H_2C=CH-O-CH_2-CH_2-CH_2-CH_2-(O-CH_2-CH_2)_{22}-OH.$$

8. The aqueous agricultural composition of claim 1 wherein said (B) macromonomer has the formula:

$$H_2C=CH-O-CH_2-CH_2-CH_2-CH_2-(O-CH_2-CH_2)_{66}-OH.$$

9. The aqueous agricultural composition of claim 1 wherein said co-polymer has a weight average molecular weight (Mw) of 2,000,000 g/mol to 15,000,000 g/mol.

10. The aqueous agricultural composition of claim 1 wherein said (B) macromonomer is utilized in an amount of from 0.5 to 2 weight percent, based on a total weight of said co-polymer.

11. The aqueous agricultural composition of claim 1 wherein said co-polymer has an intrinsic viscosity of from 3 to 26 dL/g.

12. The aqueous agricultural composition of claim 1 wherein said pesticide is a fungicide or herbicide or insecticide.

13. The aqueous agricultural composition of claim 1 wherein said pesticide is glyphosate or a salt thereof, strobilurine, glufosinate or a salt thereof and/or triclopyr-2-butoxyethyl ester.

14. The aqueous agricultural composition of claim 1 wherein upon spraying, fines % V<105 μm of less than 15 as determined using ASTM E2798-11 and a Malvern Spray Tech droplet analyzer and a TeeJet 8002VS nozzle.

15. The aqueous agricultural composition of claim 1 wherein upon spraying, fines % V<141 μm of less than 30 are produced as determined using ASTM E2798-11 and a Malvern Spray Tech droplet analyzer and a TeeJet 8002VS nozzle.

16. A method of forming the aqueous agricultural composition of claim 1, said method comprising the step of combining the pesticide, the water, and the co-polymer.

17. A method of applying the aqueous agricultural composition of claim 1 to an agricultural target, said method comprising the step of spraying the aqueous agricultural composition onto the agricultural target.

* * * * *